(12) United States Patent (10) Patent No.: US 9,489,222 B2
Zlotkin (45) Date of Patent: Nov. 8, 2016

(54) TECHNIQUES FOR WORKLOAD BALANCING AMONG A PLURALITY OF PHYSICAL MACHINES

(75) Inventor: Gilad Zlotkin, Mevaseret Zion (IL)

(73) Assignee: Radware, Ltd., Tel Aviv (IL)

( * ) Notice: Subject to any disclaimer, the term of this patent is extended or adjusted under 35 U.S.C. 154(b) by 361 days.

(21) Appl. No.: 13/590,476

(22) Filed: Aug. 21, 2012

(65) Prior Publication Data

US 2013/0055260 A1 Feb. 28, 2013

Related U.S. Application Data

(60) Provisional application No. 61/526,929, filed on Aug. 24, 2011.

(51) Int. Cl.
*G06F 9/455* (2006.01)
*G06F 9/48* (2006.01)

(52) U.S. Cl.
CPC ......... *G06F 9/45533* (2013.01); *G06F 9/4856* (2013.01)

(58) Field of Classification Search
None
See application file for complete search history.

(56) References Cited

U.S. PATENT DOCUMENTS

| | | | |
|---|---|---|---|
| 7,844,839 B2 * | 11/2010 | Palmer et al. | 713/300 |
| 8,013,859 B2 * | 9/2011 | Cannon, III | 345/440 |
| 8,555,274 B1 * | 10/2013 | Chawla et al. | 718/1 |
| 2001/0010053 A1 | 7/2001 | Ben-Shachar et al. | |
| 2004/0250248 A1 * | 12/2004 | Halpern et al. | 718/100 |
| 2008/0077928 A1 * | 3/2008 | Matsuzaki et al. | 718/104 |
| 2008/0201455 A1 * | 8/2008 | Husain | 709/220 |
| 2008/0222375 A1 | 9/2008 | Kotsovinos et al. | |
| 2008/0244213 A1 | 10/2008 | Flemming et al. | |
| 2008/0244214 A1 | 10/2008 | Flemming et al. | |
| 2008/0244215 A1 | 10/2008 | Flemming et al. | |
| 2009/0064156 A1 * | 3/2009 | He et al. | 718/104 |
| 2010/0082505 A1 * | 4/2010 | Hollingsworth et al. | 706/11 |
| 2010/0192156 A1 * | 7/2010 | Hollingsworth | 718/104 |
| 2010/0269109 A1 * | 10/2010 | Cartales | 718/1 |
| 2010/0274890 A1 * | 10/2010 | Patel et al. | 709/224 |
| 2010/0332658 A1 | 12/2010 | Elyashev | |
| 2011/0004735 A1 | 1/2011 | Arroyo et al. | |
| 2011/0022812 A1 * | 1/2011 | van der Linden et al. | 711/163 |
| 2011/0106949 A1 * | 5/2011 | Patel et al. | 709/226 |
| 2011/0131569 A1 | 6/2011 | Heim | |
| 2011/0276951 A1 * | 11/2011 | Jain | 717/140 |
| 2011/0277027 A1 * | 11/2011 | Hayton et al. | 726/8 |
| 2012/0066371 A1 | 3/2012 | Patel | |
| 2012/0096459 A1 | 4/2012 | Miyazaki | |
| 2012/0096460 A1 | 4/2012 | Sekiguchi et al. | |
| 2012/0102423 A1 * | 4/2012 | Hollingsworth et al. | 715/772 |
| 2012/0137292 A1 | 5/2012 | Iwamatsu et al. | |

(Continued)

*Primary Examiner* — Emerson Puente
*Assistant Examiner* — Mehran Kamran
(74) *Attorney, Agent, or Firm* — M&B IP Analysts, LLC (57) ABSTRACT

A method for workload balancing among a plurality of physical machines hosting a plurality of virtual machines (VMs) is disclosed. The method comprises periodically measuring a utilization of each hardware resource in each of the plurality of physical machines; computing a resource utilization score for each hardware resource based on its respective measured utilization; computing a total physical machine utilization score for each physical machine based on the computed resource utilization scores of its respective resources; and upon reception of a client request corresponding to a software application, selecting one physical machine of the plurality of physical machines to serve the client request, wherein the selection is based on the computed total physical machine utilization.

21 Claims, 4 Drawing Sheets

(56) References Cited

U.S. PATENT DOCUMENTS

| | | |
|---|---|---|
| 2012/0159634 A1 | 6/2012 | Haikney et al. |
| 2012/0166644 A1 | 6/2012 | Liu et al. |
| 2012/0179770 A1* | 7/2012 | Jalan et al. .................. 709/209 |
| 2012/0185856 A1 | 7/2012 | Ashihara et al. |
| 2012/0192175 A1 | 7/2012 | Dorai et al. |
| 2012/0204176 A1* | 8/2012 | Tian et al. ........................ 718/1 |
| 2012/0284713 A1* | 11/2012 | Ostermeyer et al. ............. 718/1 |
| 2013/0014107 A1* | 1/2013 | Kirchhofer ...................... 718/1 |
| 2013/0031240 A1* | 1/2013 | Byzek ........................... 709/224 |
| 2013/0339956 A1* | 12/2013 | Murase et al. ................... 718/1 |
| 2013/0346583 A1* | 12/2013 | Low et al. ..................... 709/223 |

\* cited by examiner

TECHNIQUES FOR WORKLOAD BALANCING AMONG A PLURALITY OF PHYSICAL MACHINES

CROSS REFERENCE TO RELATED APPLICATION

This application claims the benefit of US provisional application No. 61/526,929, filed Aug. 24, 2011, the contents of which are herein incorporated by reference.

TECHNICAL FIELD

This invention generally relates to workload balancing the utilization of resources of physical machines hosting virtual machines.

BACKGROUND

A virtual machine (VM) is a software implementation of a computer that executes programs in a way that is similar to a physical machine. The virtualization technology allows the sharing of the underlying physical hardware resources between different virtual machines, each running its own operating system (as a guest). The virtualization, which is typically performed by a hypervisor, allows multiple operating systems to run concurrently on a host computer. The hypervisor presents the guest operating systems with a virtual operating platform and monitors the execution of the guest operating systems. Further, the hypervisor defines the allocation of resources (e.g., CPU power, memory, network bandwidth, etc.) for each guest operating system.

Virtualization of computing and networking resources, such as servers, application delivery controllers (ADCs), and load balancers can improve the performance of a service provider's datacenters. Further, virtualization of such resources may reduce costs and overhead to the service providers. For example, most applications executed in datacenters utilize between 5% and 10% of the resources of the physical machine CPUs most of the time. However, by deploying such applications as virtual machines in one physical machine, utilization of 80% can be achieved. This can be achieved without compromising the isolation and independence of the physical machines hosting the applications. As a result, adoption of virtualization technologies in datacenters has been rapidly increasing over the last few years to the extent that it is expected that most services will soon be deployed as virtual machines (VMs).

Typically, a single physical machine is not sufficient to support multiple VMs, as in most cases the average resource consumption may exceed the capacity of one physical machine. With this aim, the VMs are distributed among several physical machines, such that the total average resource consumption of the VMs in one physical machine does not exceed a configurable threshold (e.g. 80%) of the physical machine's capacity. However, because resource consumption by VMs dynamically varies, a physical machine may be overload by instances of peak utilization by the VMs it hosts. Therefore, there is a need to balance the utilization of resources of physical machines by VMs hosted therein. This task is known as a workload balancing (WLB).

Figure 1:
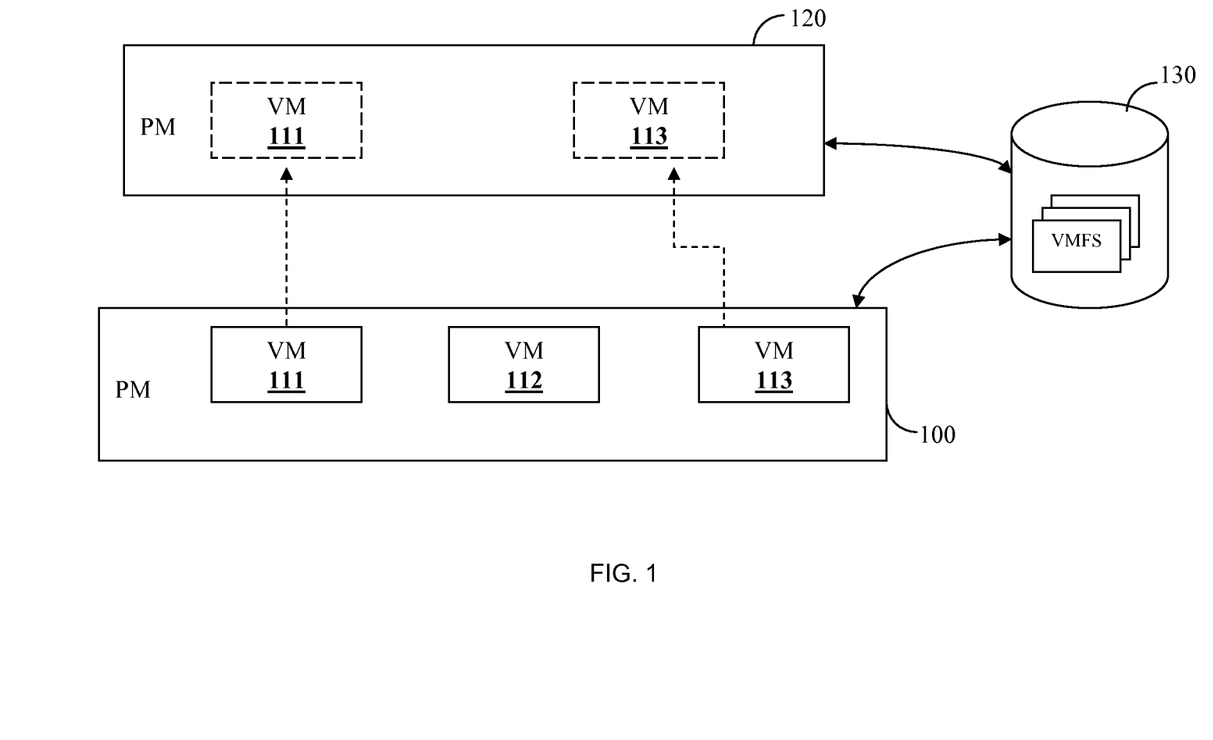
FIG. 1 is a schematic diagram illustrating a conventional VM migration process.

Prior art solutions perform the workload balancing task by a VM migration process, which is schematically illustrated in FIG. 1. A physical machine 100 executes VMs 111, 112, and 113. When it is determined that the physical machine 100 is busy (e.g., over 80% utilization) one or more VMs 111-113 are migrated to a physical machine 120 to support the additional VMs. As illustrated in FIG. 1, VMs 111 and 113 are migrated to the physical machine 120. Typically, the VM migration process requires that both the source physical machine (e.g., machine 100) and the target physical machine (e.g., machine 120) share the same storage 130 where the VM file-system (VMFS) resides. The VM migration process is performed by incrementally copying the memory image of the VM (e.g., VM 111), including the content of its registers, from the source physical machine to the target physical machine. Once the memory image has been copied, the execution of the VM on the source physical machine is halted, and execution then resumes on the target physical machine 120. The execution of the VM on the target machine is resumed from the next instruction subsequent to the instruction step in which it was stopped.

As the VMFS resides on the shared storage 130, there is no need to synchronize large amounts of persistent data and the migration can be done while turning the VM off for a very short period of time.

However, such a VM migration process is inefficient as it limits the performances of both the VMs and physical machines. Specifically, the conventional VM migration process suffers from the following drawbacks. First, the service throughout the VM is significantly degraded during the migration period, because the incremental memory replication of the VMs consumes CPU and network resources. Such degradations of service throughout can cause a temporary discontinuity of service at the switch-over point in time. Even though such a discontinuity period may be short (e.g., up to a second), for mission critical applications, this cannot be tolerated. Moreover, the application performance degradation time can be much longer, which also cannot be tolerated in mission critical applications.

In addition, the conventional VM migration process requires that all physical machines reside on the same network link (e.g., layer 2 network, VLAN, etc.) and be connected to the same shared storage domain in order that the VM can keep its IP address and its file system after the migration. Lastly, the conventional VM migration process consumes CPU and network resources used for copying the VM's memory image, thereby aggravating the situation on the congested physical machine. Due to these drawbacks network operators often prevent the migration of VMs. However, this may sacrifice the performance of the datacenters or result in an underutilized datacenter. Thus, the conventional VM migration process is an inefficient approach for workload balancing.

It would be therefore advantageous to provide a solution that would resolve the shortcomings of prior art techniques for workload balancing.

SUMMARY

Certain embodiments disclosed herein include a method for workload balancing among a plurality of physical machines hosting a plurality of virtual machines (VMs). The method comprises periodically measuring a utilization of each hardware resource in each of the plurality of physical machines; computing a resource utilization score for each hardware resource based on its respective measured utilization; computing a total physical machine utilization score for each physical machine based on the computed resource utilization scores of its respective resources; and upon reception of a client request corresponding to a software application, selecting one physical machine of the plurality of physical machines to serve the client request, wherein the selection is based on the computed total physical machine utilization.

Certain embodiments disclosed herein also include a method for workload balancing among a plurality of physical machines hosting a plurality of virtual machines (VMs). The method comprises periodically measuring a utilization of each hardware resource in each of the plurality of physical machines; computing a resource utilization score for each hardware resource based on its respective measured utilization; computing a total physical machine utilization score for each physical machine based on the computed resource utilization scores of its respective resources; computing a load-balancing weight for each physical machine based on its computed total physical machine utilization score; and distributing client requests corresponding to a software application to the plurality of physical machines proportional to the load-balancing weight computed for each physical machine, wherein the client requests are served by the plurality of VMs hosted on the plurality of physical machines.

Certain embodiments disclosed herein also include a system of workload balancing among a plurality of physical machines hosting a plurality of virtual machines (VMs). The system comprises a memory for storing executable instructions; a processor connected to a memory and operable to execute instructions in the memory to perform a process of: periodically measuring a utilization of each hardware resource in each of the plurality of physical machines; computing a resource utilization score for each hardware resource based on its respective measured utilization; computing a total physical machine utilization score for each physical machine based on the computed resource utilization scores of its respective resources; and selecting, based on the computed total physical machine utilization score, one physical machine from the plurality of physical machines to serve incoming client requests related to an execution of a software application.

BRIEF DESCRIPTION OF THE DRAWINGS

Various embodiments are particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
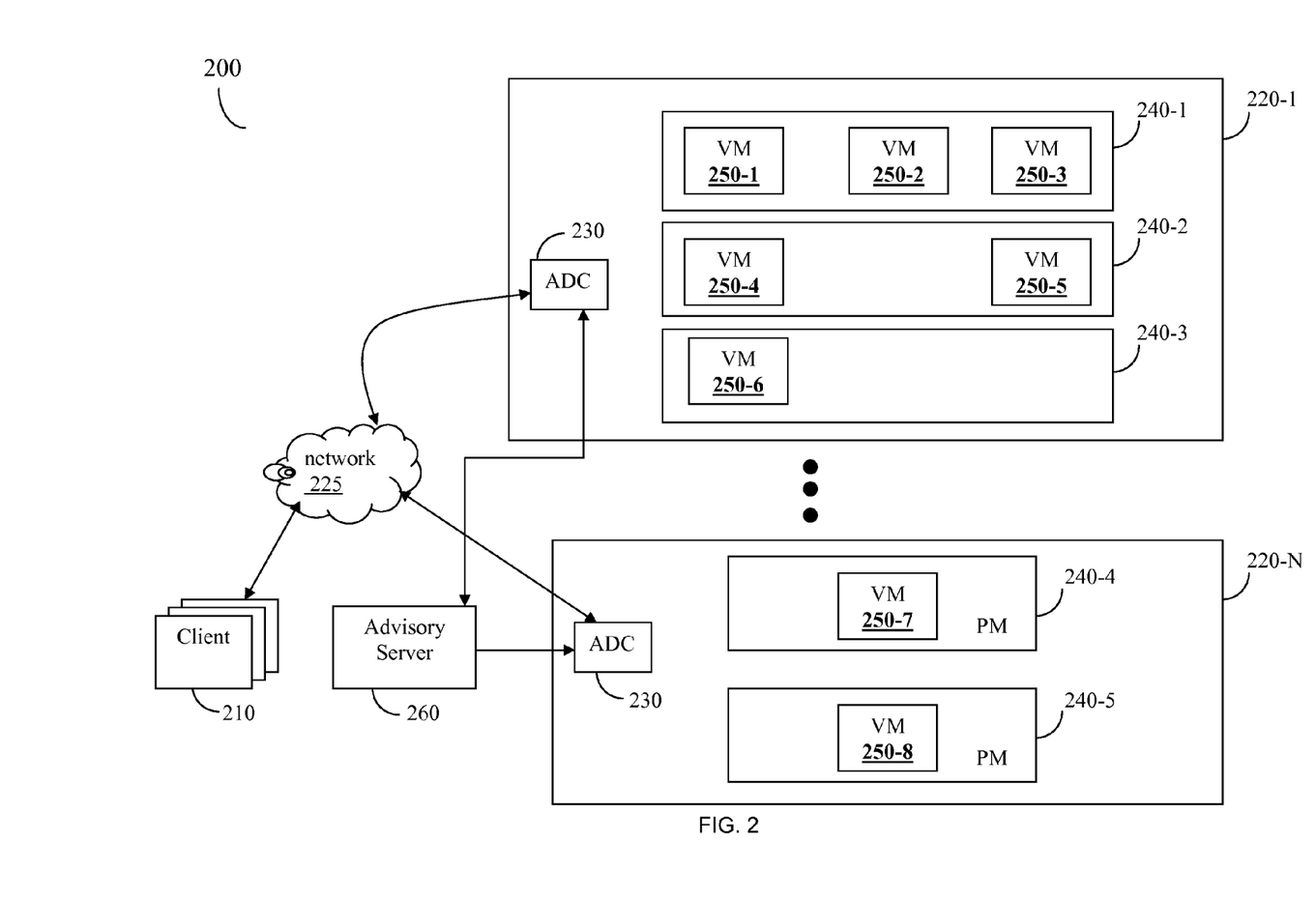
FIG. 2 is a diagram of a multi-datacenter system utilized to describe various embodiments disclosed herein.

FIG. 2 shows an exemplary and non-limiting diagram of a multi-datacenter system 200 utilized to describe various embodiments of the invention. A plurality of users of clients (collectively shown as client 210) can access, through a network 225, applications executed over one or more datacenters 220-1 through 220-N, each of which may be advantageously located at a different geographic location (site). A client 210 may be, but is not limited to, a personal computer (PC), a smartphone, a mobile phone, a tablet computer, a netbook computer, and the like. The client 210 runs a software application, (e.g., a browser) and an operating system (e.g., Windows®, Android®, Linux®, etc.) for accessing resources of the datacenters. The network 225 may be, for example, a local area network (LAN), a wide area network (WAN), the Internet, and the like.

Each datacenter 220-1 through 220-N includes an application delivery controller (ADC) 230 and a plurality of physical machines. For example, as shown in FIG. 2, the datacenter 220-1 includes physical machines 240-1, 240-2 and 240-3, while the datacenter 220-N includes physical machines 240-4 and 240-5. A physical machine may be any computing or networking resource, such as a web server, a database server, a storage appliance, a network controller, a load balancer, and the like. Typically, a physical machine includes computing resources, such as memory, one or more central processing units (CPU), storage, network connectivity, and so on. Each of the physical machines 240-1 through 240-5 can execute one or more VMs 250 as discussed in detail above.

An ADC 230 is a virtual or physical appliance designed to distribute clients' 210 requests among the virtual machines in a datacenter in order to balance the load. The operation of ADCs acting as load balancers as discussed in related art, limits balancing requests to the virtual machines. Thus, conventional ADCs cannot control the resource utilization of physical machines 240 by VMs 250. In the multi-datacenter system, the ADCs 230 deployed in the datacenters 220-1 through 220-N can communicate with each other for the purpose of global load balancing, i.e., redirecting traffic between the datacenters.

According to an embodiment, the ADC 230 installed in each datacenter 220 is adapted to load balance requests served by VMs 250 in order to achieve workload balancing (WLB). That is, according to the teachings disclosed herein, regulating clients' 210 requests served by a particular VM allows controlling the physical machine's resources consumed by the VM, thereby preventing resource exhaustion of the physical machine.

It should be noted that some VMs can execute applications that cannot be load-balanced, i.e., for which the resource consumption cannot be controlled. A VM assigned to execute such applications is designated to run a physical machine (or machines) having sufficient resources to support proper operation of the application. In addition, such a VM receives priority in resource allocation over VMs executing applications that can be load balanced.

In one embodiment, the number of instances per each application should equal the number of physical machines, where each instance is served by a VM hosted in a physical machine (i.e., VM per physical machine). In the exemplary system 200, the physical machines 240-1, 240-2 and 240-3 in datacenter 220-1 execute VMs 250-1 through 250-6, where VMs 250-1, 250-4, and 250-6 serve an instance of the application APP1. The physical machines 240-4 and 240-5 in the datacenter 220-N execute VMs 250-7 and 250-8 that also serve an instance of the application APP1. Thus, according to one embodiment, requests from clients 210 for accessing application APP1, can be distributed among the VMs 250-1, 250-4, 250-6, 250-7, and 250-8 according to the resource utilization of the physical machines 240-1 through 240-5. For example, if a request is received at the ADC 230 of the datacenter 220-1 and such a request should be served by a VM 250-1 executed over physical machine 240-1 and it is determined that the current resource utilization of physical machine 240-1 is high, then the ADC 230 of datacenter 220-1 can forward the client request to a VM on a less-loaded physical machine, e.g., any one of VMs 250-4 and 250-6. As can be understood from the above example, client's 210 requests can be forwarded to a physical machine that resides in the same or different datacenter, as long as the target physical machine runs at least one VM that can handle the requests.

In one embodiment, the load balancing decision is made by the ADC receiving the request. According to another embodiment, the load balancing decision is made by an advisory server 260. The advisory server 260 gathers and holds information with regard to the resource utilization of every physical machine 240 in the system 200, and thus can make a correlative decision with regard to the best VM to which to forward an incoming request. According to this embodiment, an ADC 230 inquires to the advisory server 260 for the forwarding decision. In response, the advisory server 260 instructs the ADC receiving the client's 210 request to forward the request to a VM that can support the execution of an application to which the request belongs. For example, if the incoming request is application APP1 (mentioned above) any of VMs 250-1, 250-4, 250-6, 250-7, and 250-8 can process the incoming request. The advisory server 260 and the ADC 230 balance the workload as will be described in greater detail below. The advisory server 260 may be implemented as a dedicated server, an ADC, a load balancer, or any networked device configured to perform the workload balancing techniques disclosed herein.

The workload balancing techniques disclosed herein are based, in part, on the utilization of a physical machine's resources. As mentioned above, such resources include, but are not limited to, CPU core(s), memory, storage, and network connectivity (i.e., network interface cards). According to one embodiment, the resource utilization is based on one or more of the following measurements: CPU utilization, i.e., the CPU cycles utilized by all CPU cores of the physical machine divided by the maximum cycles available on all of the cores; a memory allocation, i.e., the memory allocated out of the total available physical memory; bandwidth utilization, i.e., the consumed bit rate divided by the available bandwidth on all network interface cards (NICs) installed in the physical machines; a input/output (I/O) operations rate (I/O); and a memory page swap rate (MPR). Other resource utilization measures will be apparent to one of ordinary skill in the art.

These measures can be collected by the ADCs 230 and/or the advisory server 260 from at least one of a hypervisor of a VM or a management system controlling the VMs installed on a physical machine (both are not shown in FIG. 2). In one embodiment, the utilization of a particular resource is an average of its respective utilization measurements over a configurable period of time. The time period is based on the application. For example, for time sensitive applications, the time period is relatively short. For example, 5 seconds for time sensitive application versus 120 seconds for other applications. A load threshold for each resource is also defined as a maximum allowable utilization of the resource. For example, 85% may be a load threshold of the physical memory, i.e., up to 85% of the physical memory can be allocated without considering resource load. The load threshold is a configurable parameter, e.g., by a user. As will be discussed below, the various workload balancing levels discussed herein ensures that no resource utilization exceeds its load threshold.

Figure 3:
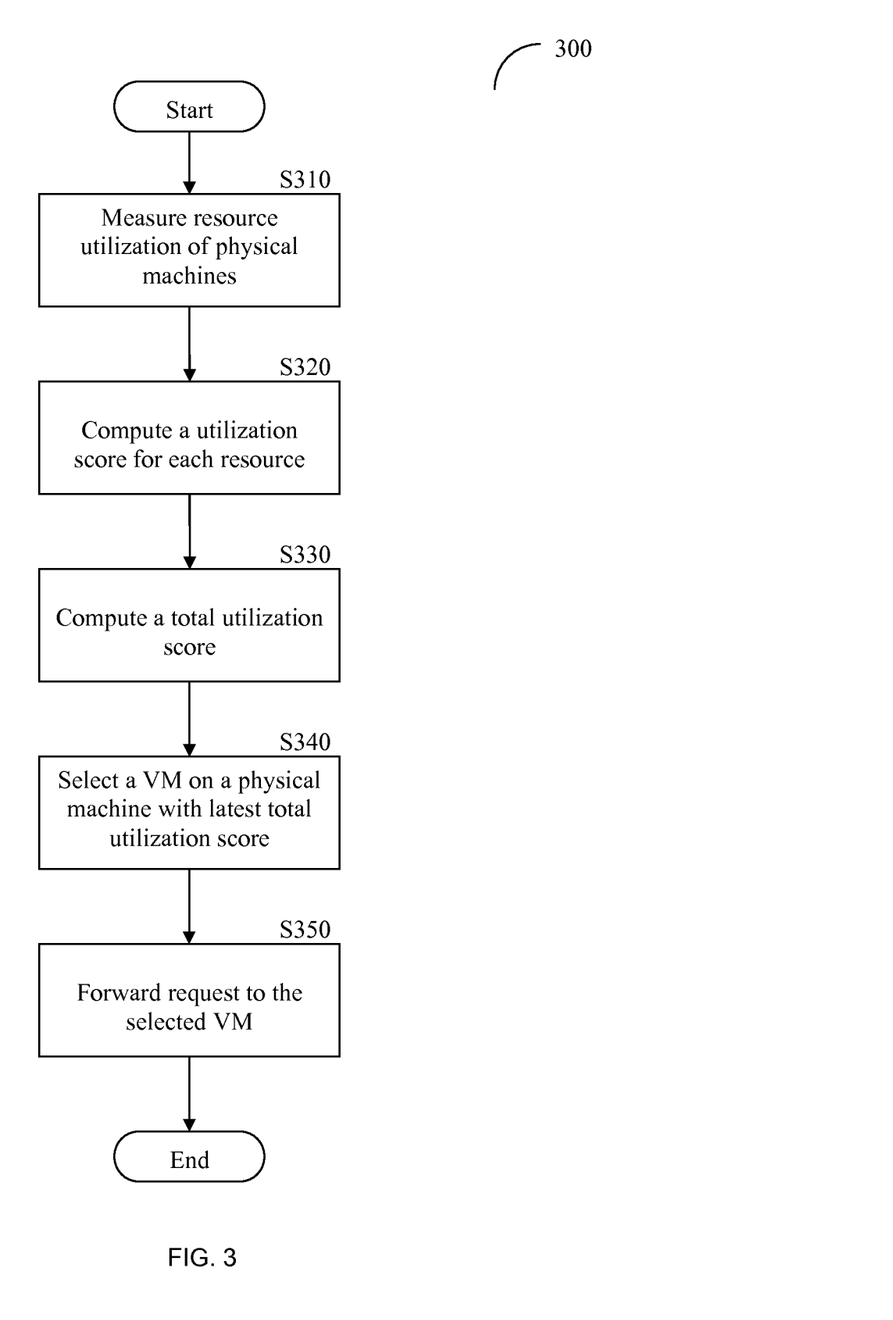
FIG. 3 is a flowchart describing a method for workload balancing among a plurality of physical machines hosting a plurality of VMs according to one embodiment.

FIG. 3 shows an exemplary and non-limiting flowchart 300 describing the method for workload balancing among a plurality of physical machines hosting a plurality of VMs according to an embodiment of the invention. The method can be performed by the ADCs 230 and/or advisory server 260 described with reference to FIG. 2. The method balances requests among a plurality of VMs that run an instance of the same application. That is, the method selects the VM to serve a request (received from a client) of the application. As shown above, different VMs hosted over different physical machines in one or more datacenters can be selected to serve an incoming request.

At S310, the resource utilization of each resource in each physical machine that hosts the VMs that can execute the application to be load balanced is periodically measured. As mentioned above, the resource utilization measures include, but are not limited, CPU utilization, memory allocation, page swap rate, I/O operation rates, and bandwidth utilization. The resource utilization of a physical machine resource in one embodiment is an average of a number of measurements over time.

At S320, for each physical machine (pm) and a resource type (r), a resource utilization (RU) score is computed as follows:

$$\text{RU\_Score}(pm, r) = \text{weight}(r) \frac{(1 - RU(pm, r))}{\text{load\_TH}(r)} \quad [\text{Eq. 1}]$$

where, the weight (r) is determined based on the relevancy of the respective measure utilization for the resource for the proper execution of the application. For example, if the application is CPU intensive, the weight of the CPU utilization measure is higher than weights of other resources. The RU(pm,r) parameter is the resource utilization measured for the resource 'r' and the load TH(r) is the threshold value between 0 and 1 representing the utilization percentage (e.g., between 0%-100%) set for the resource. It should be noted that the load TH(r) may have the same value for the same type of resource regardless of the physical machines. For example, load TH value for the memory resource in each physical machine (pm) can be set to a value of 0.85, i.e., the memory utilization should not exceed 85%.

It should be noted that for physical machines that should be shutdown (e.g., for maintenance purposes), the utilization score is not computed, thus such machines cannot be utilized for the workload balancing. That is, VMs executed on such machines do not receive requests from the ADC.

In one embodiment, the score is computed for each physical machine (and each of its resources) that hosts one or more VMs that can execute an instance of the application. In another embodiment, the score is computed for only a subset of such physical machines. The subset of physical machines includes only physical machines in which none of the resources exceeds their respective load threshold or machines with the least significant over-utilized resource (e.g., I/O rate).

At S330, a total utilization score for each physical machine is computed as the sum of scores for the resources of the physical machine divided by the sum of the weights of the resources. That is, the total utilization score of a physical machine (PMU_Score) is computed as follows:

$$PMU\_Score(pm) = \frac{\sum_r RU\_Score(pm, r)}{\sum_r weight(r)} \quad [Eq. 2]$$

At S340, the physical machine with the lowest total utilization score is determined and a VM hosted on this physical machine is selected to serve the request. Thus, the selection is according to the least utilized physical machine. It should be noted that if the determined physical machine hosts two or more VMs that can serve the client request, the target VM is arbitrarily selected. At S350, the client request is forwarded to the selected VM.

As noted above the method discussed herein can be performed by the advisory server 260, each of the ADCs installed in the datacenters, or by the operation of both the advisory server 260 and each of the ADCs 230. Specifically, the advisory server 260 can independently perform the resource utilization measures or receive such measures from the ADCs. In multi-datacenter system configuration that does not include the advisory server 260, each ADC 230 measures the resource utilization of the physical machines connected thereto.

It should be appreciated that the method described with reference to FIG. 3 provides real-time workload balancing, and thus is applicable for time sensitive applications. The forwarding decision may be made for each incoming client request. It should be further appreciated that the method is fully distributed. That is, each ADC measures the same resources on the same physical machines, thus the workload is diverted to physical machines that are least likely to congest and preferably are least loaded. It should also be appreciated that the flow of the FIG. 3 flowchart does not necessarily require each step to be carried out in a precise order or timing.

Figure 4:
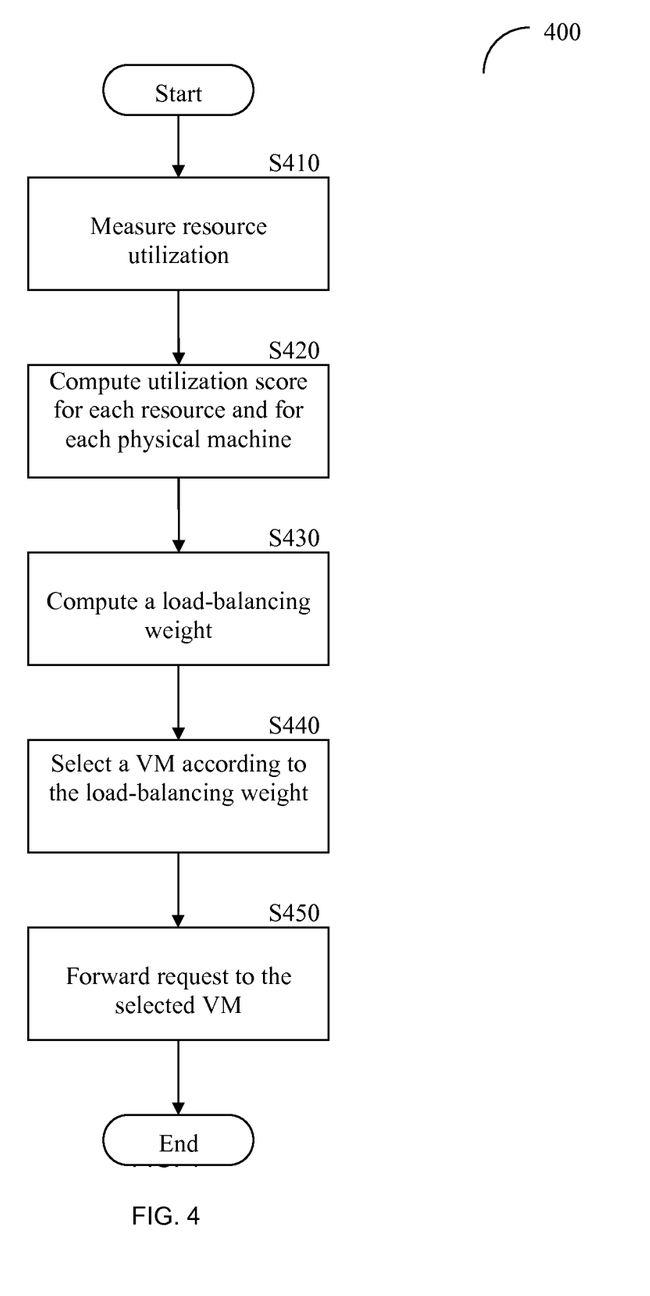
FIG. 4 is a flowchart describing a method for workload balancing among a plurality of physical machines hosting a plurality of VMs according to another embodiment

FIG. 4 shows an exemplary and non-limiting flowchart 400 for workload balancing among a plurality of physical machines hosting a plurality of VMs according to another embodiment of the invention. The method can be performed by each of the ADCs 230 and/or advisory server 260. The method workload balances requests among a plurality of VMs that run an instance of the same application by observing trends in the utilization of resources. Based on the determined trends, the method sets load-balancing weights associated with physical machines. Accordingly, a highly utilized physical machine is set with a low load-balancing weight and vice versa. The load-balancing weight determines the relative number of requests that are to be dispatched to a respective physical machine compared to other physical machines. For example, a physical machine with a load-balancing weight of '4' receives twice as many requests in comparison to a physical machine with weight of '2'.

At S410, the utilization of each resource in each physical machine that hosts the VMs running an instance of the application to be load balanced is measured. As mentioned above, the resource utilization of a resource may be an average of a number of measurements over a period of time. In this particular embodiment, the period of time is configured for a relatively long time, e.g., 60-300 seconds.

In S420, the utilization score of each resource on each physical machine hosting the VM is computed as shown in equation 1 (Eq. 1). In addition, the total utilization score for each physical machine is computed as demonstrated in equation 2 (Eq. 2). At S430, the load-balancing weight ($LB_w$) for each physical machine (pm) is computed as the round number of a predefined value (v) divided by the total utilization score calculated for the physical machine. That is, for example, $$LBw(pm) = \frac{v}{PMU\_Score(pm)}; \quad [Eq. 3]$$

where, the PMU_Score is the utilization score computed for a physical machine, and v is the predefined value (e.g. 100).

At S440, upon reception of a client request, the target VM is selected according to the proportion of the load-balancing weights of physical machines hosting VMs that can serve the request. At S450, the client request is forwarded to the selected VM.

It should be apparent to one of ordinary skill that the load balancing process discussed above can be combined with the global load balancing criteria, such as proximity, a load of a given site, and so on. That is, a physical machine may be selected based on its computed load-balancing weight and one or more global load balancing criteria. It should also be appreciated that the flow of the FIG. 4 flowchart does not necessarily require each step to be carried out in a precise order or timing.

In another embodiment of the invention, the VM to serve a client request can be selected based on a normalized score computed for the physical machine hosting the VM. The normalized score is the total resource utilization score computed as shown in equation 2 (Eq. 2) above divided by the load-balancing weight of the physical machine. According to this embodiment, a client request is sent to a VM hosted on a physical machine with the lowest normalized score.

It should be apparent to one of ordinary skill that the workload balancing process discussed above can be combined with the global load balancing criteria, such as proximity, a load of a given site, and so on. That is, a physical machine may be selected based on its computed total utilization score and one or more global load balancing criteria.

It should be noted that the various embodiments discussed herein can eliminate the need for performing the process of VM migration. That is, prior art solutions require migration of a VM when the physical machine executing the VM becomes congested or otherwise should be shutdown. According to the disclosed embodiment, the incoming requests are not routed to congested physical machines, thereby enabling easing the load on such machines. It should be further noted that the embodiments described herein can be utilized in a live VM migration process to reduce the load of a physical machine hosting a migrated VM. Reducing the load on the VM, also reduces the memory image and changes that should be copied to a target machine, thereby enabling fast and successfully completion of the live migration process.

Certain embodiments disclosed herein also define the preferred hosting of VMs on physical machines. According to these embodiments, all VMs serving a particular application should be installed on different physical machines and the number of VMs should not exceed the number of physical machines. In addition, the VMs are distributed evenly on the physical machines, such that the number of VMs per physical machine is approximately equal.

The foregoing detailed description has set forth a few of the many forms that the invention can take. It is intended that the foregoing detailed description be understood as an illustration of selected forms that the invention can take and not as a limitation to the definition of the invention.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for workload balancing among a plurality of physical machines hosting a plurality of virtual machines (VMs), comprising:
    periodically measuring a utilization of each hardware resource in each of the plurality of physical machines that host VMs that can execute an application to be load balanced;
    computing a resource utilization score for each hardware resource based on its type, respective measured utilization, weight factor and load threshold;
    wherein the load threshold is a predefined threshold set for a specific hardware resource type;
    wherein the weight factor is determined based on the relevancy of the measured resource utilization for a proper execution of the application;
    computing a total physical machine utilization score for each physical machine based on the computed resource utilization scores of its respective resources;
    upon reception of a client request corresponding to a software application, selecting one physical machine of the plurality of physical machines to serve the client request, wherein the selection is based on the computed total physical machine utilization; and
    forwarding the client request to a VM hosted on the selected physical machine, wherein all of the plurality of VMs hosted on the plurality of physical machines run an instance of the software application.

2. The method of claim 1, wherein the physical machine with a lowest total physical machine utilization score is selected to serve the client request.

3. The method of claim 2, wherein each hardware resource is any one of: one or more central processing unit (CPU) cores, physical memory, input/output interfaces, storage, and one or more network interface cards (NICs).

4. The method of claim 3, wherein a measured utilization of a hardware resource is any one of: utilization of the one or more CPU cores, a percentage allocated memory out of the total available physical memory, a percentage of a bandwidth utilization out of a total available bandwidth on the one or more NICs, a input/output (I/O) operations rate, and a memory page swap rate (MPR).

5. The method of claim 4, wherein the measured utilization of each hardware resource is an average of a plurality of utilization measurements for the respective hardware resource over time.

6. The method of claim 4, wherein the resource utilization score for each hardware resource s computed as follows:

$$\text{weight}(r) * (1 - \text{resource\_utilization}(pm, r)) / \text{load\_threshold}(r),$$

wherein resource_utilization(pm, r) is the measured resource utilization for the hardware resource, and load_threshold is a predefined threshold set for a specific hardware resource type.

7. The method of claim 6, wherein the weight (r) factor is determined based on the relevancy of the measured resource utilization for a proper execution of the software application.

8. The method of claim 7, wherein the total physical machine utilization score of a physical machine is a sum of utilization resource scores computed for the hardware resources of the physical machine divided by a sum of the weight factors of the hardware resources.

9. The method of claim 1, further comprising:
    computing a load-balancing weight for each physical machine of the plurality of physical machines; and
    distributing client's requests to the plurality of physical machines proportional to a computed load-balancing weight of each physical machine of the plurality of physical machines.

10. The method of claim 9, wherein each physical machine of the plurality of physical machines hosts at least one VM configured to run an instance of the software application.

11. The method of claim 10, wherein the plurality of physical machines are operable in a plurality of datacenters, wherein the client's requests are forwarded to a group of physical machines connected in a datacenter by means of an application delivery controller (ADC), wherein the method is performed by the ADC connected in each datacenter.

12. The method of claim 11, wherein a plurality of ADCs connected in the plurality of datacenters communicate with an advisory server, wherein the advisory server selects the physical machine.

13. A non-transitory computer readable medium having stored thereon instructions for causing a processor to perform a method of claim 1.

14. A method for workload balancing among a plurality of physical machines hosting a plurality of virtual machines (VMs), comprising:
    periodically measuring a utilization of each hardware resource in each of the plurality of physical machines that host VMs that can execute an application to be load balanced;
    computing a resource utilization score for each hardware resource based on its type, respective measured utilization, weight factor and load threshold;
    wherein the load threshold is a predefined threshold set for a specific hardware resource type;
    wherein the weight factor is determined based on the relevancy of the measured resource utilization for a proper execution of the application;
    computing a total physical machine utilization score for each physical machine based on the computed resource utilization scores of its respective resources;

computing a load-balancing weight for each physical machine based on its computed total physical machine utilization score; and distributing client requests corresponding to a software application to the plurality of physical machines proportional to the load-balancing weight computed for each physical machine, wherein the client requests are served by the plurality of VMs hosted on the plurality of physical machines.

15. The method of claim 14, wherein the load-balancing weight for each physical machine is computed as a round number of a predefined value divided by the total physical machine utilization score calculated for the respective physical machine.

16. The method of claim 14, wherein all of the plurality of VMs hosted on the plurality of physical machines run an instance of the software application, and wherein each physical machine of the plurality of physical machines hosts at least one VM configured to run an instance of the software application.

17. A non-transitory computer readable medium having stored thereon instructions for causing a processor to perform a method of claim 14.

18. A system of workload balancing among a plurality of physical machines hosting a plurality of virtual machines (VMs), comprising:

a memory for storing executable instructions;

a processor connected to a memory and operable to execute instructions in the memory to configure the system to:

periodically measure a utilization of each hardware resource in each of the plurality of physical machines that host VMs that can execute an application to be load balanced;

compute a resource utilization score for each hardware resource based on its type, respective measured utilization, weight factor and load threshold;

wherein the load threshold is a predefined threshold set for a specific hardware resource type;

wherein the weight factor is determined based on the relevancy of the measured resource utilization for a proper execution of the application;

compute a total physical machine utilization score for each physical machine based on the computed resource utilization scores of its respective resources, wherein the total physical machine utilization score of a physical machine is a sum of utilization resource scores computed for the hardware resources of the physical machine divided by a sum of the weight factors of the hardware resources;

select, based on the computed total physical machine utilization score, one physical machine from the plurality of physical machines to serve an incoming client request related to an execution of a software application; and forward the client request to a VM hosted on the selected physical machine, wherein all of the plurality of VMs hosted on the plurality of physical machines run an instance of the software application.

19. The system of claim 18, wherein each physical machine of the plurality of physical machines hosts at least one VM configured to run an instance of the software application.

20. The system of claim 19, wherein the system is integrated in any one of: an application delivery controller (ADC) and an advisory server.

21. The system of claim 20, wherein the plurality of physical machines are operable in a plurality of datacenters, wherein client's requests are forwarded to a group of physical machines connected in a datacenter by means of ADC, wherein ADCs connected in the plurality of datacenters communicate with an advisory server.

* * * * *